(12) United States Patent
Bourdev et al.

(10) Patent No.: US 9,704,029 B2
(45) Date of Patent: *Jul. 11, 2017

(54) SYSTEMS AND METHODS FOR IDENTIFYING USERS IN MEDIA CONTENT BASED ON POSELETS AND NEURAL NETWORKS

(71) Applicant: Facebook, Inc., Menlo Park, CA (US)

(72) Inventors: Lubomir Bourdev, Mountain View, CA (US); Ning Zhang, Menlo Park, CA (US); Balamanohar Paluri, Menlo Park, CA (US); Yaniv Taigman, Los Altos, CA (US); Robert D. Fergus, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/284,296

(22) Filed: Oct. 3, 2016

(65) Prior Publication Data

US 2017/0024611 A1 Jan. 26, 2017

Related U.S. Application Data

(63) Continuation of application No. 14/573,366, filed on Dec. 17, 2014.

(51) Int. Cl.
*G06K 9/00* (2006.01)
*G06K 9/66* (2006.01)
(Continued)

(52) U.S. Cl.
CPC ..... *G06K 9/00362* (2013.01); *G06K 9/00335* (2013.01); *G06K 9/6215* (2013.01);
(Continued)

(58) Field of Classification Search
None
See application file for complete search history.

(56) References Cited

U.S. PATENT DOCUMENTS

2005/0197981 A1* 9/2005 Bingham ............. G06N 3/0454
706/20
2009/0060340 A1* 3/2009 Zhou ...................... G06T 7/405
382/190
(Continued)

FOREIGN PATENT DOCUMENTS

WO WO 2008042242 A2 * 4/2008 ......... H04N 7/17318

OTHER PUBLICATIONS

Bourdev, Lubomir et al., "Detecting People Using Mutually Consistent Poselet Activations," Proceedings of the 11th European Conference on Computer Vision: Part VI (ECCV'10), Sep. 2010.
(Continued)

*Primary Examiner* — Delomia L Gilliard
(74) *Attorney, Agent, or Firm* — Sheppard Mullin Richter & Hampton LLP

(57) ABSTRACT

Systems, methods, and non-transitory computer-readable media can receive a first image including a representation of a first user. A second image including a representation of a second user can be received. A first set of poselets associated with the first user can be detected in the first image. A second set of poselets associated with the second user can be detected in the second image. The first image including the first set of poselets can be inputted into a first instance of a neural network to generate a first multi-dimensional vector. The second image including the second set of poselets can be inputted into a second instance of the neural network to generate a second multi-dimensional vector. A first distance metric between the first multi-dimensional vector and the second multi-dimensional vector can be determined.

20 Claims, 11 Drawing Sheets

(51) Int. Cl.
*G06K 9/62* (2006.01)
*G06N 3/08* (2006.01)
(52) U.S. Cl.
CPC ............ *G06K 9/6271* (2013.01); *G06K 9/66* (2013.01); *G06N 3/08* (2013.01)

(56) References Cited

U.S. PATENT DOCUMENTS

| | | | |
|---|---|---|---|
| 2011/0069940 A1* | 3/2011 | Shimy | G11B 27/105 386/296 |
| 2015/0139485 A1* | 5/2015 | Bourdev | G06K 9/00362 382/103 |
| 2015/0178265 A1* | 6/2015 | Anderson | G06F 17/276 704/9 |
| 2015/0186771 A1* | 7/2015 | Bhatt | G06N 99/005 706/20 |
| 2015/0278908 A1* | 10/2015 | Nice | G06Q 30/02 705/26.7 |
| 2016/0027079 A1* | 1/2016 | Schoeffler | H04N 5/23293 705/325 |
| 2016/0055410 A1* | 2/2016 | Spagnola | G06N 3/08 706/16 |

OTHER PUBLICATIONS

Bourdev, Lubomir et al., "Poselets: Body Part Detectors Trained Using 3D Human Pose Annotations," Proceedings of the 12th IEEE International Conference on Computer Vision (ICCV 2009), Sep. 2009.

Bourdev, Lubomir et al., "Deep Poselets for Human Detection," arXiv.org, Document No. 1407.0717, Jul. 2014.

Yi, Dong et al., "Deep Metric Learning for Practical Person Re-Identification," Journal of Latex Class Files, vol. 11, No. 4, Dec. 2012.

* cited by examiner

650

Determine that the first distance metric is less than a specified distance threshold
652

↓

Indicate that the first user and the second user correspond to a same user
654

FIGURE 6B

SYSTEMS AND METHODS FOR IDENTIFYING USERS IN MEDIA CONTENT BASED ON POSELETS AND NEURAL NETWORKS

CROSS-REFERENCE TO RELATED APPLICATIONS

This application is a continuation of U.S. patent application Ser. No. 14/573,366, filed on Dec. 17, 2014 and entitled "SYSTEMS AND METHODS FOR IDENTIFYING USERS IN MEDIA CONTENT BASED ON POSELETS AND NEURAL NETWORKS", which is incorporated herein by reference.

FIELD OF THE INVENTION

The present technology relates to the field of media content processing. More particularly, the present technology relates to techniques for identifying users in media content based on poselets and neural networks.

BACKGROUND

Today, people often utilize computing devices (or systems) for a wide variety of purposes. Users can use their computing devices to, for example, interact with one another, create content, share information, and access information. In some instances, a user of a computing device can utilize a camera or other image sensor of the computing device (or system) to capture or record media content, such as images and/or videos.

In some cases, under conventional approaches, media content such as images can be analyzed in attempt to identify users represented or included in the images. For example, facial recognition technology can be utilized to determine an identity of a user captured in an image. However, if faces of users in media content are not clearly captured or represented, then conventional facial recognition techniques may not be capable of accurately identifying those users in the media content. As such, in some cases, conventional approaches can be inefficient and ineffective. Due to these and other reasons, conventional approaches can create challenges for or reduce the overall user experience associated with utilizing computing devices (or systems) to interact and engage with media content.

SUMMARY

Various embodiments of the present disclosure can include systems, methods, and non-transitory computer readable media configured to receive a first image including a representation of a first user. A second image including a representation of a second user can be received. A first set of poselets associated with the first user can be detected in the first image. A second set of poselets associated with the second user can be detected in the second image. The first image including the first set of poselets can be inputted into a first instance of a neural network to generate a first multi-dimensional vector. The second image including the second set of poselets can be inputted into a second instance of the neural network to generate a second multi-dimensional vector. A first distance metric between the first multi-dimensional vector and the second multi-dimensional vector can be determined.

In an embodiment, a third image including a representation of a third user can be received. A third set of poselets associated with the third user can be detected in the third image. The third image including the third set of poselets can be inputted into a third instance of the neural network to generate a third multi-dimensional vector. A second distance metric between the first multi-dimensional vector and the third multi-dimensional vector can be determined. The neural network can be modified to cause the first distance metric to be lesser than the second distance metric.

In an embodiment, the first image can correspond to a query image. The second image can correspond to a positive image. The third image can correspond to a negative image. The first image, the second image, and the third image can be included in a set of training images. The first user and the second user can correspond to a same user. The third user can be different from the first user and the second user.

In an embodiment, the modifying of the neural network can include modifying one or more weights associated with the neural network via one or more neural network back-propagation processes.

In an embodiment, the modifying of the neural network to cause the first distance metric to be lesser than the second distance metric can be based on minimizing a loss metric. The loss metric can be determined by calculating a maximum value between zero and (1−the second distance metric+the first distance metric).

In an embodiment, the first distance metric can correspond to a first Euclidean distance between the first multi-dimensional vector and the second multi-dimensional vector. The second distance metric can correspond to a second Euclidean distance between the first multi-dimensional vector and the third multi-dimensional vector.

In an embodiment, it can be determined that the first distance metric is less than a specified distance threshold. It can be indicated that the first user and the second user correspond to a same user.

In an embodiment, the first set of poselets and the second set of poselets can be included within a set of defined poselets.

In an embodiment, the set of defined poselets can be associated with at least one of a body portion, a combination of multiple body portions, a front facial portion, a side facial portion, a head portion, a hair portion, a wearable article portion, a perspective, or a pose.

In an embodiment, each of the first multi-dimensional vector and the second multi-dimensional vector can be associated with 256 dimensions.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 6B illustrates an example method associated with identifying users in media content based on poselets and neural networks, according to an embodiment of the present disclosure.

Figure 1:
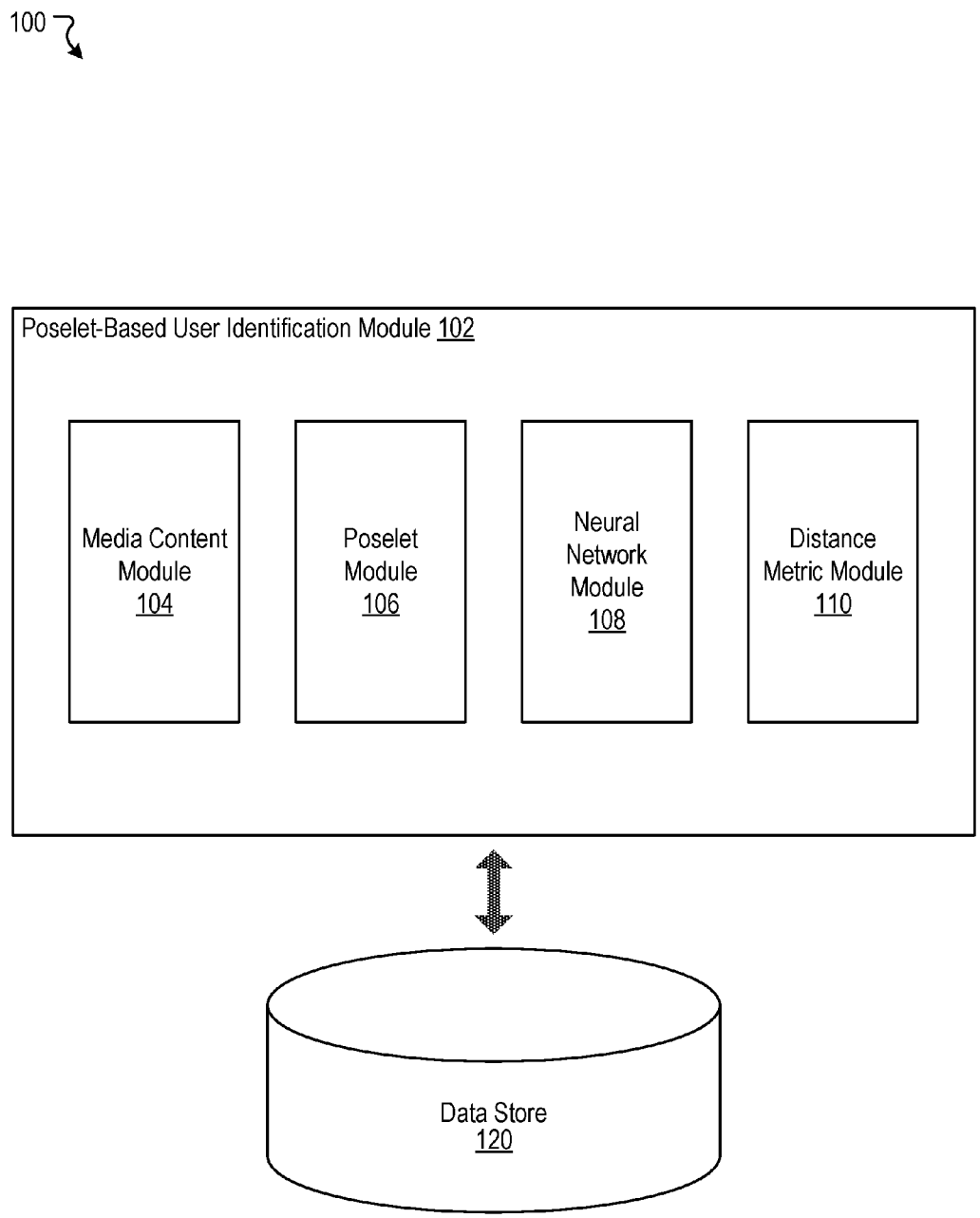
FIG. 1 illustrates an example system including an example poselet-based user identification module configured to facilitate identifying users in media content based on poselets and neural networks, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Identifying Users in Media Content Based on Poselets and Neural Networks

People use computing devices (or systems) for a wide variety of purposes. Computing devices can provide different kinds of functionality. Users can utilize their computing devices to produce information, access information, and share information. In some cases, computing devices can include or correspond to cameras capable of capturing or recording media content, such as images or videos.

In some instances, media content can include or represent one or more persons. For example, a media content item such as an image can include a visual representation of a user, such as when the image includes the user's face. Conventional approaches to media content processing can utilize facial recognition techniques to identify (or verify) a user's identity based on a representation of the user's face included in media content. However, in some cases, conventional approaches such as facial recognition techniques require a high quality or otherwise suitable image of the user's face in order to produce an accurate identification (or verification) of the user. In one example, when a user has turned his or her head such that the user's face is not facing forward in a captured image, the identity of the user may not be accurately identified using conventional approaches. In another example, under conventional approaches, the user's identity may not be accurately identified when the user's face appears to be far away and/or blurry in the image.

As such, conventional approaches can be inefficient, uninteresting, and ineffective. Therefore, an improved approach can be beneficial for addressing or alleviating various concerns associated with conventional approaches. The disclosed technology facilitates identifying users in media content based on poselets and neural networks. The disclosed technology can analyze multiple images where each image includes a person (also referred to as a user), and can determine whether the person in each image is the same or not. In some cases, the disclosed technology can utilize users' clothes, hairstyles, glasses, etc., to identify and distinguish between users. In some cases, even if users are not facing the camera, have blurred faces, or are far away from the camera, etc., the disclosed technology can still attempt to identify and distinguish between users.

Various embodiments of the present disclosure can receive a first image including a representation of a first user. A second image including a representation of a second user can be received. A first set of poselets associated with the first user can be detected in the first image. A second set of poselets associated with the second user can be detected in the second image. The first image including the first set of poselets can be inputted into a first instance of a neural network to generate a first multi-dimensional vector. The second image including the second set of poselets can be inputted into a second instance of the neural network to generate a second multi-dimensional vector. A first distance metric between the first multi-dimensional vector and the second multi-dimensional vector can be determined. It is contemplated that there can be many variations and/or other possibilities.

FIG. 1 illustrates an example system 100 including an example poselet-based user identification module 102 configured to facilitate identifying users in media content based on poselets and neural networks, according to an embodiment of the present disclosure. As shown in the example of FIG. 1, the poselet-based user identification module 102 can include a media content module 104, a poselet module 106, a neural network module 108, and a distance metric module 110. In some instances, the example system 100 can also include at least one data store 120. The components (e.g., modules, elements, etc.) shown in this figure and all figures herein are exemplary only, and other implementations may include additional, fewer, integrated, or different components. Some components may not be shown so as not to obscure relevant details.

In some embodiments, the poselet-based user identification module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the poselet-based user identification module 102 can be implemented, in part or in whole, as software running on one or more computing devices or systems, such as on a user or client computing device. For example, the poselet-based user identification module 102 can be implemented as or within an application (e.g., app), a program, or an applet, etc., running on a user computing device or a client computing system. In another example, the poselet-based user identification module 102 can be implemented using one or more computing devices or systems that include one or more servers, such as network servers or cloud servers. In some instances, the poselet-based user identification module 102 can, in part or in whole, be implemented within or configured to operate in conjunction with a social networking system (or service), such as the social networking system 730 of FIG. 7. It should be understood that there can be many variations or other possibilities.

The media content module 104 can be configured to receive or acquire a first image (or other media content) including a representation of a first user. The media content module 104 can be configured to receive a second image including a representation of a second user. In some cases, the first image can include a visual or graphical representation of the first user's face, arm, body, leg, and/or other body portion. In some instances, the first image can include a visual or graphical representation of the first user's hairstyle, clothes, and/or accessories, etc. Similarly, in some cases, the second image can include a visual or graphical representation of the second user's face, body portion, hairstyle, clothes, and/or accessories, etc.

In some embodiments, the media content module 104 can communicate and/or operate with the at least one data store 120 to receive or acquire the first and second images. The at least one data store 120 can be configured to store and maintain various types of data, including (but not limited to) the first and second images. In some implementations, the at least one data store 120 can store information associated with the social networking system (e.g., the social networking system 730 of FIG. 7). The information associated with the social networking system can include data about users, social connections, social interactions, locations, geo-fenced areas, maps, places, events, groups, posts, communications, content, account settings, privacy settings, a social graph, and various other types of data. In some implementations, the at least one data store 120 can store information associated with users, such as user identifiers, user information, user specified settings, content produced by users, and various other types of user data. As shown in the example system 100, the poselet-based user identification module 102 can be configured to communicate and/or operate with the at least one data store 120.

Moreover, the poselet module 106 can be configured to facilitate detecting in the first image a first set of poselets associated with the first user. The poselet module 106 can be further configured to facilitate detecting in the second image a second set of poselets associated with the second user. The poselet module 106 will be discussed in more detail below with reference to FIG. 2A.

The neural network module 108 can be configured to facilitate inputting the first image including the first set of poselets into a first instance of a neural network to generate a first multi-dimensional vector. The neural network module 108 can also be configured to facilitate inputting the second image including the second set of poselets into a second instance of the neural network to generate a second multi-dimensional vector. More details regarding the neural network module 108 will be provided below with reference to FIG. 2B.

Moreover, the distance metric module 110 can be configured to facilitate determining a first distance metric between the first multi-dimensional vector and the second multi-dimensional vector. In some embodiments, the first distance metric can correspond to a Euclidean distance between the first multi-dimensional vector and the second multi-dimensional vector. For example, the Euclidean distance between a first vector $V_1$ and a second vector $V_2$ can be equal to $\|V_1 - V_2\|^2$. In some implementations, the distance metric module 110 can be configured to receive or acquire a plurality of vectors as input and calculate a distance metric, such as a Euclidean distance, for each pair of vectors in the plurality of vectors. It should be understood that many variations are possible.

Furthermore, in some embodiments, a third image including a representation of a third user can be received by the media content module 104. A third set of poselets associated with the third user can be detected by the poselet module 106. The third image including the third set of poselets can be inputted, by the neural network module 108, into a third instance of the neural network to generate a third multi-dimensional vector. The distance metric module 110 can determine a second distance metric between the first multi-dimensional vector and the third multi-dimensional vector. The neural network module 108 can modify the neural network to cause the first distance metric to be lesser than the second distance metric. Again, it should be appreciated that many variations are possible.

Figure 2A:
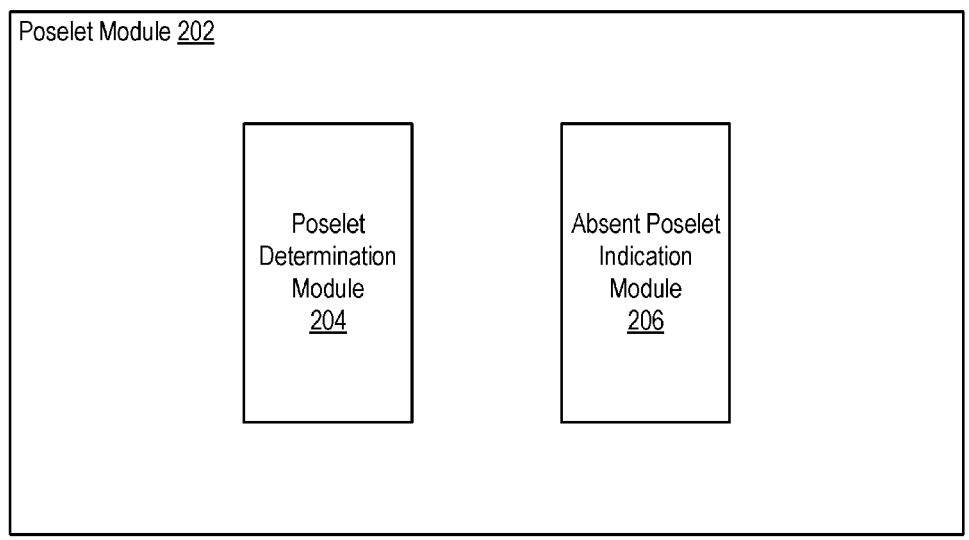
FIG. 2A illustrates an example poselet module configured to facilitate identifying users in media content based on poselets and neural networks, according to an embodiment of the present disclosure.

FIG. 2A illustrates an example poselet module 202 configured to facilitate identifying users in media content based on poselets and neural networks, according to an embodiment of the present disclosure. In some embodiments, the poselet module 106 of FIG. 1 can be implemented as the example poselet module 202. As shown in FIG. 2A, the example poselet module 202 can include a poselet determination module 204 and an absent poselet indication module 206.

As discussed above, the example poselet module 202 can facilitate detecting, in the first image, a first set of poselets associated with the first user as well as detecting, in the second image, a second set of poselets associated with the second user. The poselet determination module 204 can be utilized, at least in part, to determine, identify, and/or detect the first set of poselets as well as the second set of poselets. In general, a poselet can refer to a body part or body portion of a person (i.e., user) that is included, incorporated, and/or represented in an image. A poselet can include a part or portion of a user's pose or body configuration that is included in the image as a visual or graphical representation. Each poselet can, for example, capture, incorporate, and/or represent a salient pattern associated with a particular pose of a user from a particular perspective or viewpoint. In some instances, poselets can correspond to parts or portions that are tightly clustered in an appearance space and a configuration space. The configuration space of an articulated body can be parameterized, represented, and/or described by three-dimensional coordinates of one or more joints of the body. The appearance space can be parameterized, represented, and/or described by pixel values in a two-dimensional space. In some embodiments, poselets can provide a robust distributed representation of a user from which characteristics, attributes, properties, and/or other information about the user can be determined or inferred without explicitly localizing various body parts of the user.

In some implementations, the poselet determination module 204 can be configured to analyze one or more images, such as the first, second, and/or third images received or acquired by the media content module 104 of FIG. 1. The poselet determination module 204 can analyze the images to determine whether or not certain poselets are present, activated, and/or triggered in a particular image. In some cases, there can be a set of defined poselets. In some instances, the first set of poselets and the second set of poselets can be included within the set of defined poselets. The set of defined poselets can be associated with at least one of a body portion, a combination of multiple body portions, a front facial portion, a side facial portion, a head portion, a hair portion, a wearable article portion, a perspective, or a pose, etc. In one example, the set of defined poselets can include 150 various kinds or types of poselets, such as a frontal head poselet, a frontal shoulder poselet, and a profile head poselet, an arm poselet, etc. It is contemplated that there are numerous variations and other possibilities. Various embodiments can utilize, at least in part, the detected poselets of users within images to identify and/or distinguish between the users.

In some implementations, each image can be associated with a respective poselet bank, library, or storage element, and each poselet within an image can be represented using a respective array of values stored in the image's respective poselet bank. In one example, each array can include 256 values for representing or describing a corresponding poselet. It is understood that other suitable quantities of values can be utilized and that many variations are possible.

In some embodiments, the absent poselet indication module 206 can be configured to indicate which poselets are absent, missing, non-activated, etc., within the images. In one example, if a user in an image has turned his or her face away from the camera when the image was captured, then the frontal head poselet can be absent, whereas the profile head poselet can be present. As such, in this example, the absent poselet indication module 206 can indicate, via a 257th (binary) value in the array for the frontal head poselet, that the frontal head poselet is absent. In some cases, the indication that a particular poselet is absent can be utilized to distinguish the particular absent poselet from another poselet, such as a poselet represented entirely by black-colored pixels. Moreover, in some implementations, since there can be 150 various kinds or types of poselets, the number of poselets that are activated or present for a particular image can be limited or sparse relative to the total spectrum of poselets (e.g., 150 types of poselets).

Figure 2B:
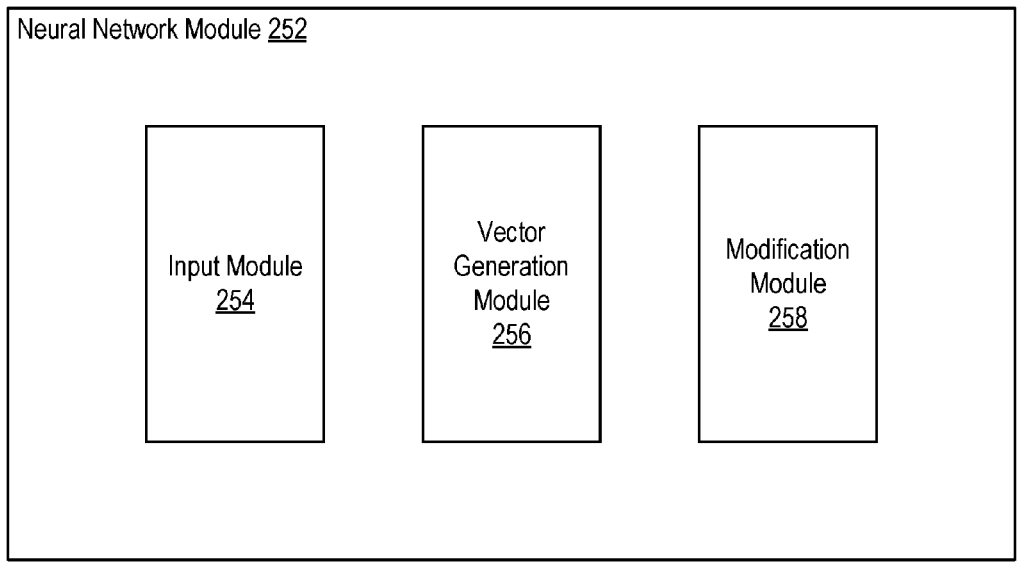
FIG. 2B illustrates an example neural network module configured to facilitate identifying users in media content based on poselets and neural networks, according to an embodiment of the present disclosure.

FIG. 2B illustrates an example neural network module 252 configured to facilitate identifying users in media content based on poselets and neural networks, according to an embodiment of the present disclosure. In some embodiments, the neural network module 108 of FIG. 1 can be implemented as the example neural network module 252. As shown in FIG. 2B, the example neural network module 252 can include an input module 254, a vector generation module 256, and a modification module 258.

As discussed previously, a first set of poselets associated with a first user can be detected in a first image and a second set of poselets associated with a second user can be detected in a second image. The input module 254 can be configured to facilitate inputting the first image including the first set of poselets into a first instance of a neural network. The input module 254 can also be configured to facilitate inputting the second image including the second set of poselets into a second instance of the neural network. In general, a neural network can refer to a computational model used to determine, calculate, and/or approximate one or more functions that can depend on various inputs and that can be generally unknown. Neural networks can, in some cases, be represented as systems of interconnected nodes or elements, which can be referred to as "neurons". Neural networks can be configured to facilitate determining, calculating, computing, and/or approximating, etc., one or more values from one or more inputs. Neural networks can be adaptive and thus can be configured to perform machine learning and pattern recognition. In some embodiments, the neural network can correspond to a convolutional neural network. In general, a convolutional neural network can refer to a feed-forward artificial neural network in which individual neurons are tiled or configured such that the neurons respond to overlapping regions in a visual field. Convolutional neural networks can be utilized as models for image recognition and processing. Many variations are possible.

The vector generation module 256 can be configured to facilitate generating a first multi-dimensional vector based on the inputting of the first image including the first set of poselets into the first instance of the neural network. The vector generation module 256 can also be configured to facilitate generating a second multi-dimensional vector based on the inputting of the second image including the second set of poselets into the second instance of the neural network. In some embodiments, each of the first multi-dimensional vector and the second multi-dimensional vector can be associated with 256 dimensions. For example, the vector generation module 256 can generate the first multi-dimensional vector to be a first 256-dimensional vector and can generate the second multi-dimensional vector to be a second 256-dimensional vector.

In some instances, the generating of the first and second multi-dimensional vectors can be similar to a dimension-reduction process. The first and second multi-dimensional vectors can be generated to describe, encompass, and/or represent, etc., the first and second images including the first and second sets of poselets while reducing the complexities of the first and second images, respectively. Accordingly, the first and second images including the first and second sets of poselets (or relevant/important portions thereof) can be represented (and simplified) by the first and second multi-dimensional vectors. In some cases, a distance metric such as a Euclidean distance can subsequently be determined for a pair of generated multi-dimensional vectors. The distance metric can be utilized to assess how close or far away the vectors in the pair are. As such, the distance metric can be used to assess how similar or different the pair's corresponding images/poselets are.

Furthermore, in some implementations, the modification module 258 can be configured to facilitate modifying the neural network. For example, the modification module 258 can modify one or more weights associated with the neural network via one or more neural network back-propagation processes. A back-propagation process can generally refer to a method of training neural networks used in conjunction with an optimization method such as gradient descent. Accordingly, the back-propagation can be utilized, such as in conjunction with other processes (e.g., the optimization method), to train the neural network to identify and distinguish between users.

Figure 3:
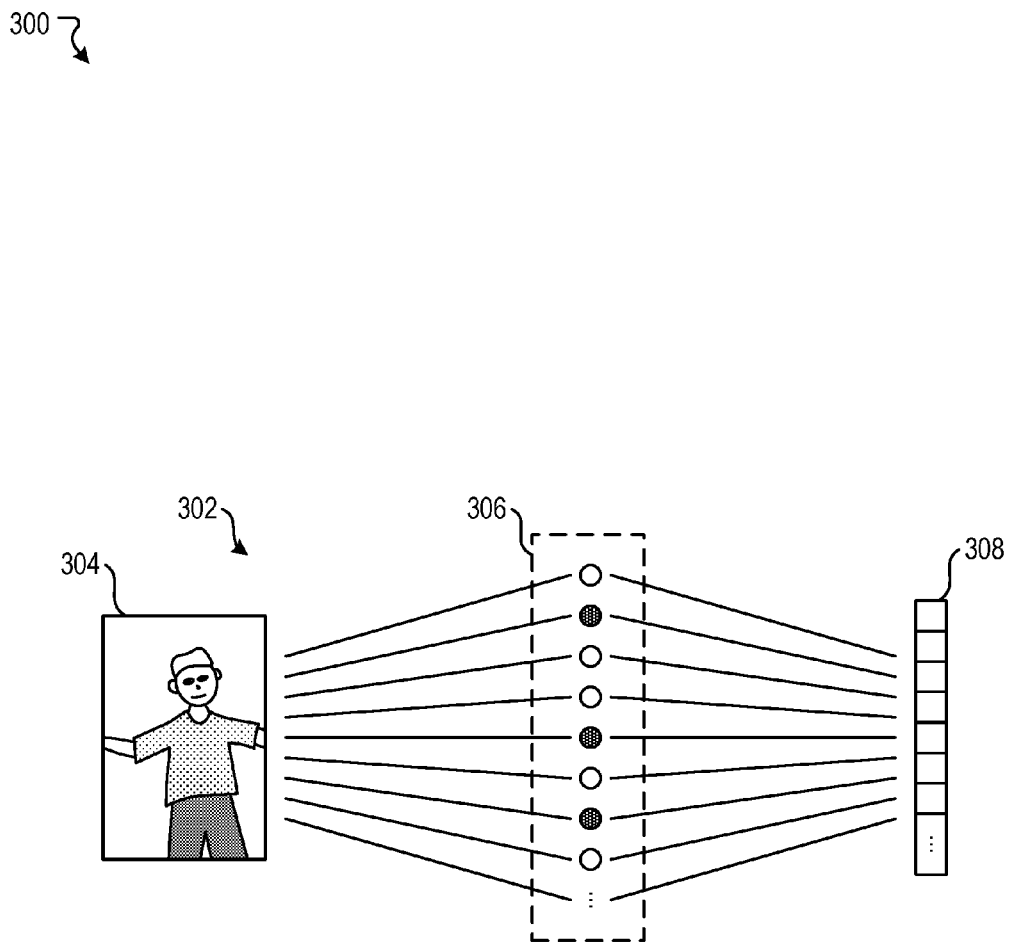
FIG. 3 illustrates an example scenario associated with identifying users in media content based on poselets and neural networks, according to an embodiment of the present disclosure.

FIG. 3 illustrates an example scenario 300 associated with identifying users in media content based on poselets and neural networks, according to an embodiment of the present disclosure. The example scenario 300 illustrates an example neural network 302. The example scenario 300 also shows an image 304 including a user (User A). In this example scenario 300, a set of poselets can be detected, identified, or determined out of a set of defined poselets 306 as being included, represented, present, and/or activated in the image 304. In this example, the set of poselets included, represented, present, and/or activated in the image 304 can be shown as being darkened in the set of defined poselets 306.

In some embodiments, the example neural network 302 can receive as input the image 304 including the set of poselets (e.g., the darkened circular elements). The neural network 302 can output a multi-dimensional vector 308 that represents or describes the image 304 including the set of poselets. It should be understood that the example scenarios described herein are for illustrative purposes and not necessarily drawn to scale. There can be many variations and other possibilities.

Figure 4A:
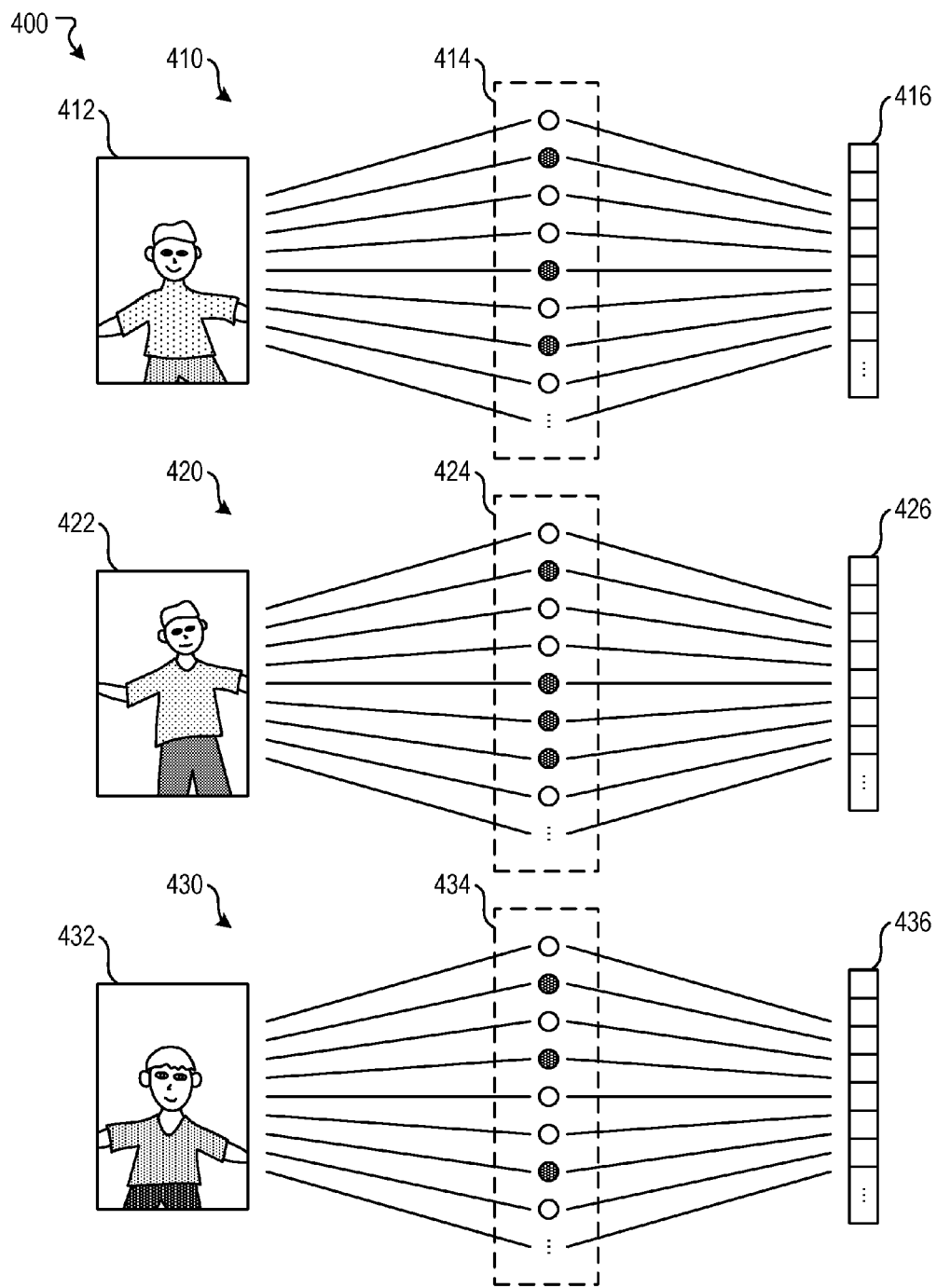
FIG. 4A illustrates an example scenario associated with identifying users in media content based on poselets and neural networks, according to an embodiment of the present disclosure.

FIG. 4A illustrates an example scenario 400 associated with identifying users in media content based on poselets and neural networks, according to an embodiment of the present disclosure. The example scenario 400 illustrates how a neural network can be trained. In the example scenario 400, there can be a first instance (or copy) 410 of the neural network, a second instance 420 of the neural network, and a third instance 430 of the neural network. In some embodiments, there can be a set of training images that have already been labeled, marked, recognized, and/or categorized, etc. The example scenario 400 shows a set of three training images including a query image 412, a positive image 422, and a negative image 432. The query image 412 includes a graphical representation of User A. The positive image 422 also includes a graphical representation of User A. In contrast, the negative image 432 includes a graphical representation of User B. The neural network can be trained and modified such that the network can recognize that the query image 412 including User A is more similar to the positive image 422 including User A, than to the negative image 432 which includes User B.

In some implementations, a first set of poselets (e.g., darkened elements in poselet set 414) associated with User A can be detected in the query image 412. A second set of poselets (e.g., darkened elements in poselet set 424) associated with User A can be detected in the positive image 422. A third set of poselets (e.g., darkened elements in poselet set 434) associated with User B can be detected in the negative image 432. The query image 412 including the first set of poselets can be inputted into the first neural network instance 410 and a first multi-dimensional vector 416 can be outputted. The positive image 422 including the second set of poselets can be inputted into the second neural network instance 420 and a second multi-dimensional vector 426 can be outputted. The negative image 432 including the third set of poselets can be inputted into the third neural network instance 430 and a third multi-dimensional vector 436 can be outputted. Moreover, a first distance metric (e.g., Euclidean distance) between the first multi-dimensional vector and the second multi-dimensional vector can be determined. A second distance metric between the first and third multi-dimensional vectors can also be determined.

In some embodiments, the training of the neural network can include modifying the neural network to cause the first distance metric to be lesser than the second distance metric. In some cases, one or more weights associated with the neural network can be modified via one or more neural network back-propagation processes. As discussed, a back-propagation process can refer to a neural network training method used, in some cases, with an optimization method. The back-propagation process can calculate a gradient of a loss function with respect to the weights associated with the neural network. The gradient can be provided to the optimization method. The optimization method can update the weights in attempt to minimize the loss function. In some embodiments, the weights for each instance (e.g., instances 412, 422, and 432) of the neural network can be averaged in a training iteration of the neural network. In some cases, the loss function can correspond to a loss metric determined by calculating a maximum value between zero and (1−the second distance metric+the first distance metric). The modifying of the neural network to cause the first distance metric to be lesser than the second distance metric can be based on minimizing the loss metric. Furthermore, iterations of this training process can be repeated using other training images. Many variations are possible.

Figure 4B:
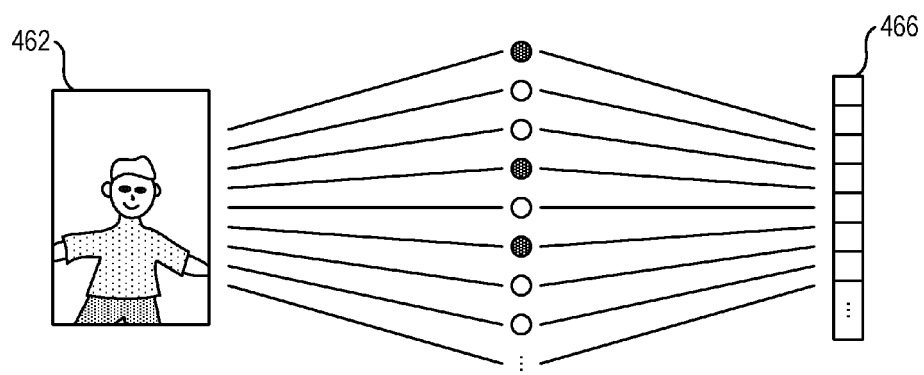
FIG. 4B illustrates an example scenario associated with identifying users in media content based on poselets and neural networks, according to an embodiment of the present disclosure.
Figure 4B:
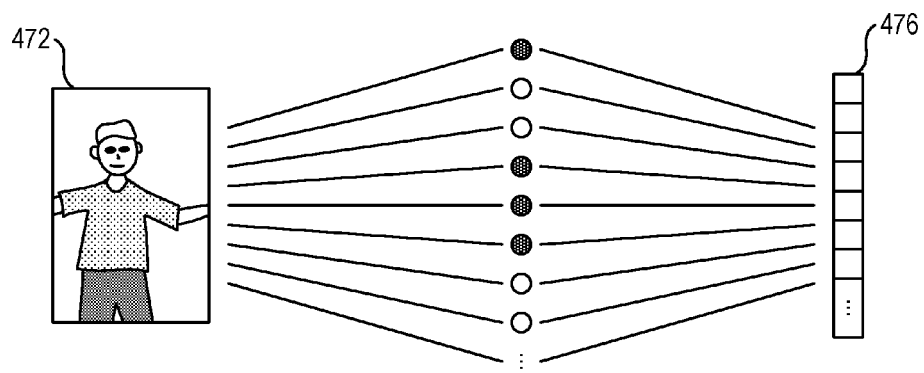

FIG. 4B illustrates an example scenario 450 associated with identifying users in media content based on poselets and neural networks, according to an embodiment of the present disclosure. The example scenario 450 illustrates how a neural network can be tested. In some embodiments, there can be a set of testing images that have already been labeled, marked, recognized, and/or categorized, etc. The example scenario 450 shows a set of two testing images 462 and 472. The images 462 and 472 including their respective poselets can be inputted into the neural network (or into two identical neural network instances with identical weights) in order to generate respective multi-dimensional vectors 466 and 476. A distance metric between the multi-dimensional vectors 466 and 476 can be determined. The neural network can pass this test iteration if it is determined that the distance metric is less than a specified distance threshold. If the distance metric is less than the specified distance threshold, then it can be indicated that the users in the two testing images 462 and 472 correspond to the same user. Iterations of the testing can be repeated using other testing images. Again, it should be appreciated that many variations are possible.

Figure 5:
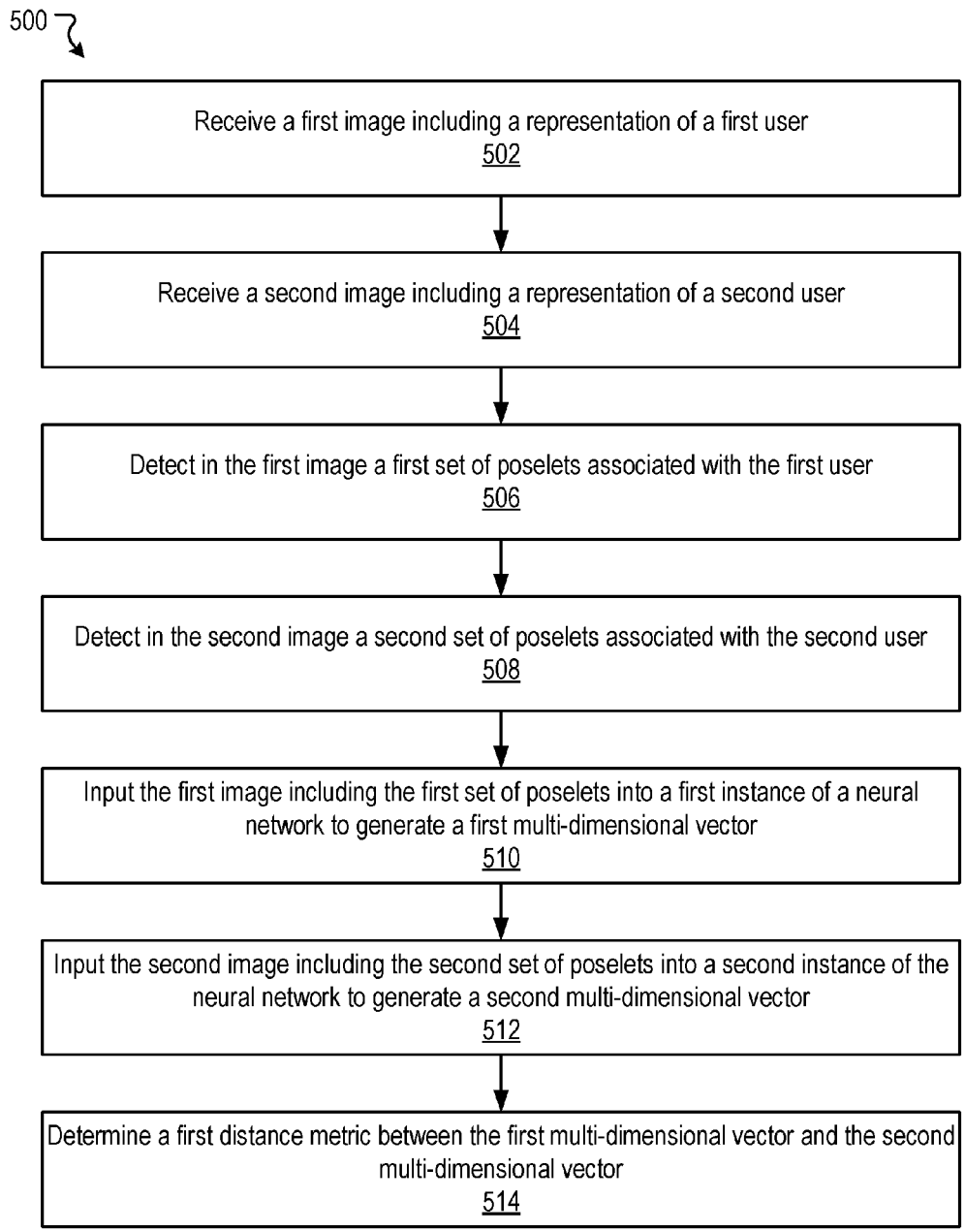
FIG. 5 illustrates an example method associated with identifying users in media content based on poselets and neural networks, according to an embodiment of the present disclosure.

FIG. 5 illustrates an example method 500 associated with identifying users in media content based on poselets and neural networks, according to an embodiment of the present disclosure. It should be appreciated that there can be additional, fewer, or alternative steps performed in similar or alternative orders, or in parallel, within the scope of the various embodiments unless otherwise stated.

Figure 6A:
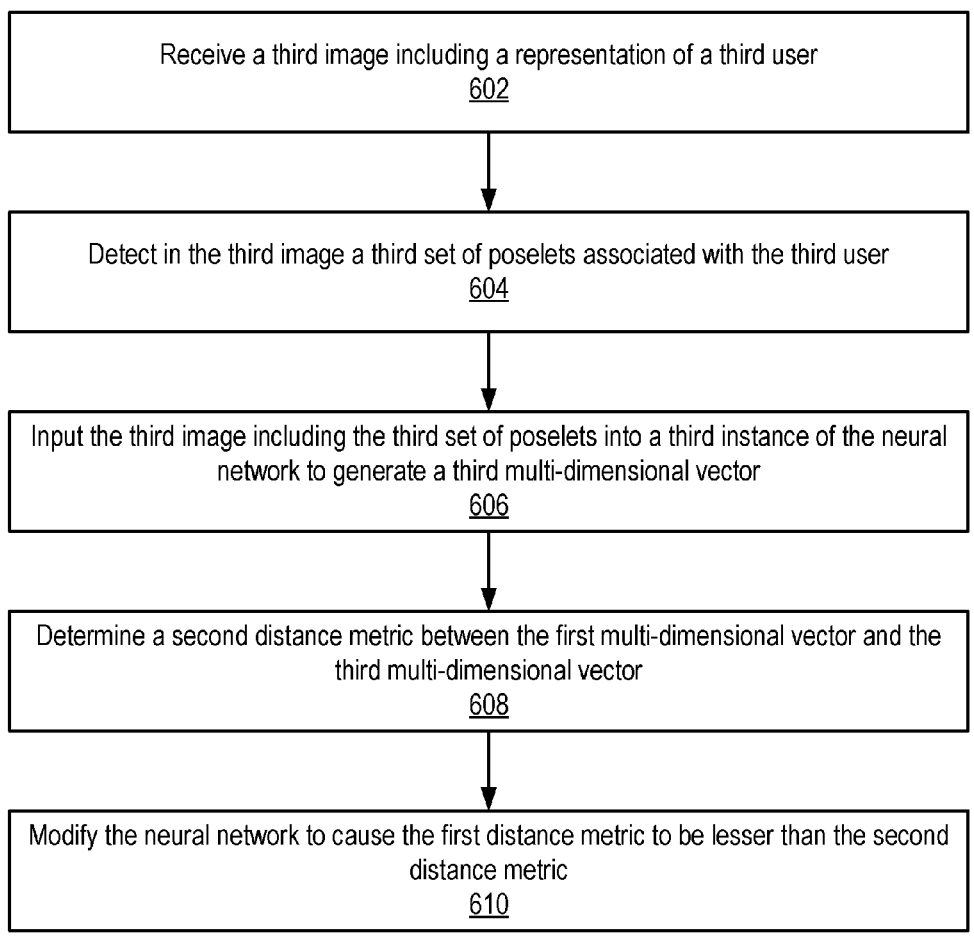
FIG. 6A illustrates an example method associated with identifying users in media content based on poselets and neural networks, according to an embodiment of the present disclosure.

At block 502, the example method 500 can receive a first image including a representation of a first user. At block 504, the example method 500 can receive a second image including a representation of a second user. At block 506, the example method 500 can detect in the first image a first set of poselets associated with the first user. At block 508, the example method 500 can detect in the second image a second set of poselets associated with the second user. At block 510, the example method 500 can input the first image including the first set of poselets into a first instance of a neural network to generate a first multi-dimensional vector. At block 512, the example method 500 can input the second image including the second set of poselets into a second instance of the neural network to generate a second multi-dimensional vector. At block 514, the example method 500 can determine a first distance metric between the first multi-dimensional vector and the second multi-dimensional vector FIG. 6A illustrates an example method 600 associated with identifying users in media content based on poselets and neural networks, according to an embodiment of the present disclosure. Again, it should be understood that there can be additional, fewer, or alternative steps performed in similar or alternative orders, or in parallel, within the scope of the various embodiments unless otherwise stated.

At block 602, the example method 600 can receive a third image including a representation of a third user. At block 604, the example method 600 can detect in the third image a third set of poselets associated with the third user. At block 606, the example method 600 can input the third image including the third set of poselets into a third instance of the neural network to generate a third multi-dimensional vector. At block 608, the example method 600 can determine a second distance metric between the first multi-dimensional vector and the third multi-dimensional vector. At block 610, the example method 600 can modify the neural network to cause the first distance metric to be lesser than the second distance metric.

FIG. 6B illustrates an example method 650 associated with identifying users in media content based on poselets and neural networks, according to an embodiment of the present disclosure. As indicated previously, it should be understood that there can be additional, fewer, or alternative steps performed in similar or alternative orders, or in parallel, within the scope of the various embodiments unless otherwise stated.

At block 652, the example method 650 can determine that the first distance metric is less than a specified distance threshold. At block 654, the example method 650 can indicate that the first user and the second user correspond to a same user.

In some embodiments, various embodiments of the present disclosure can be configured or trained to recognize or identify a particular user or person. In some embodiments, various embodiments can be configured or trained to differentiate among multiple users or persons.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained. In another example, various embodiments of the present disclosure can learn, improve, and/or be refined over time.

Social Networking System—Example Implementation

Figure 7:
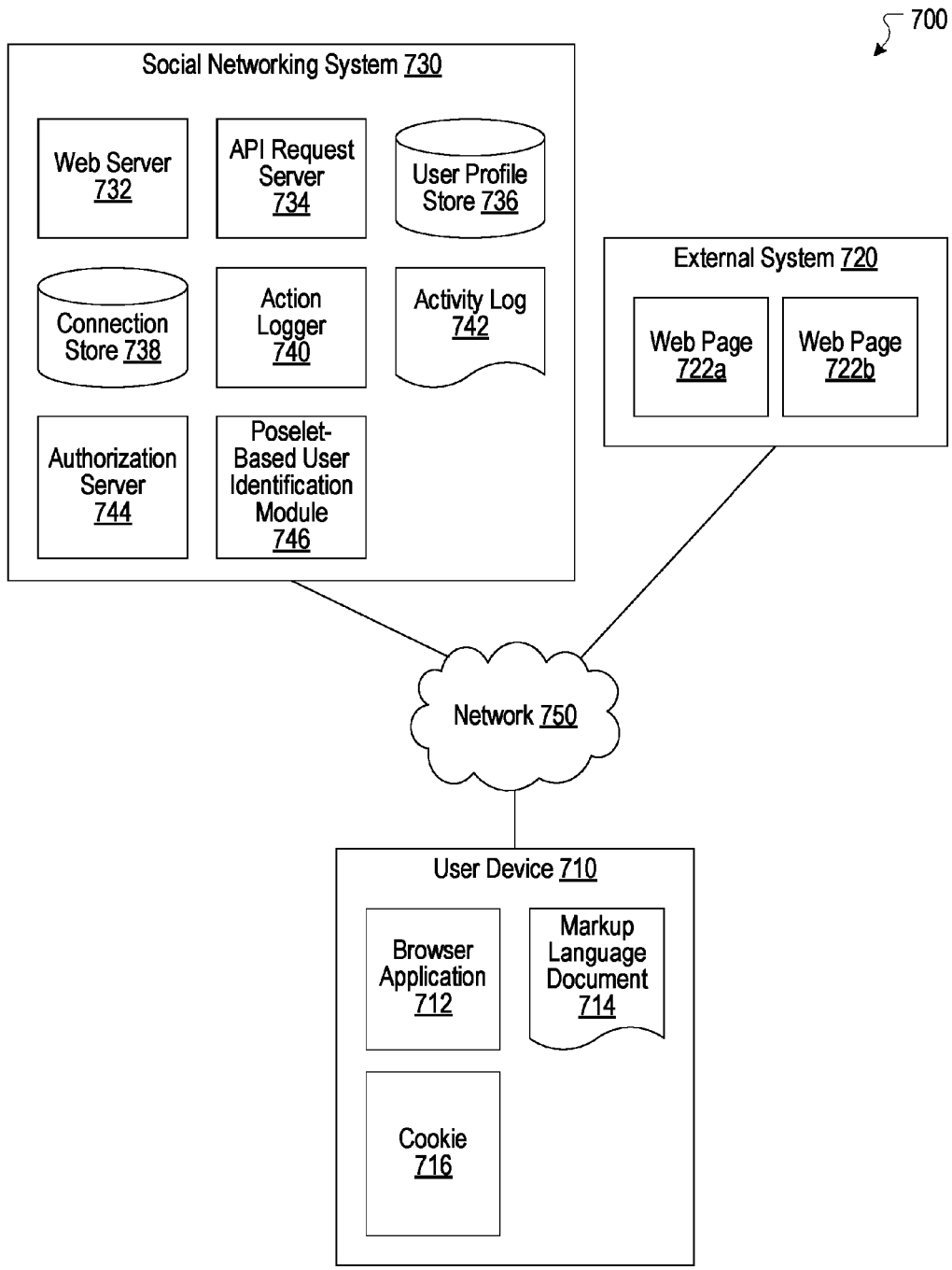
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a poselet-based user identification module 746. The poselet-based user identification module 746 can, for example, be implemented as the poselet-based user identification module 102 of FIG. 1. Other features of the poselet-based user identification module 746 are discussed herein in connection with the poselet-based user identification module 102.

Hardware Implementation

Figure 8:
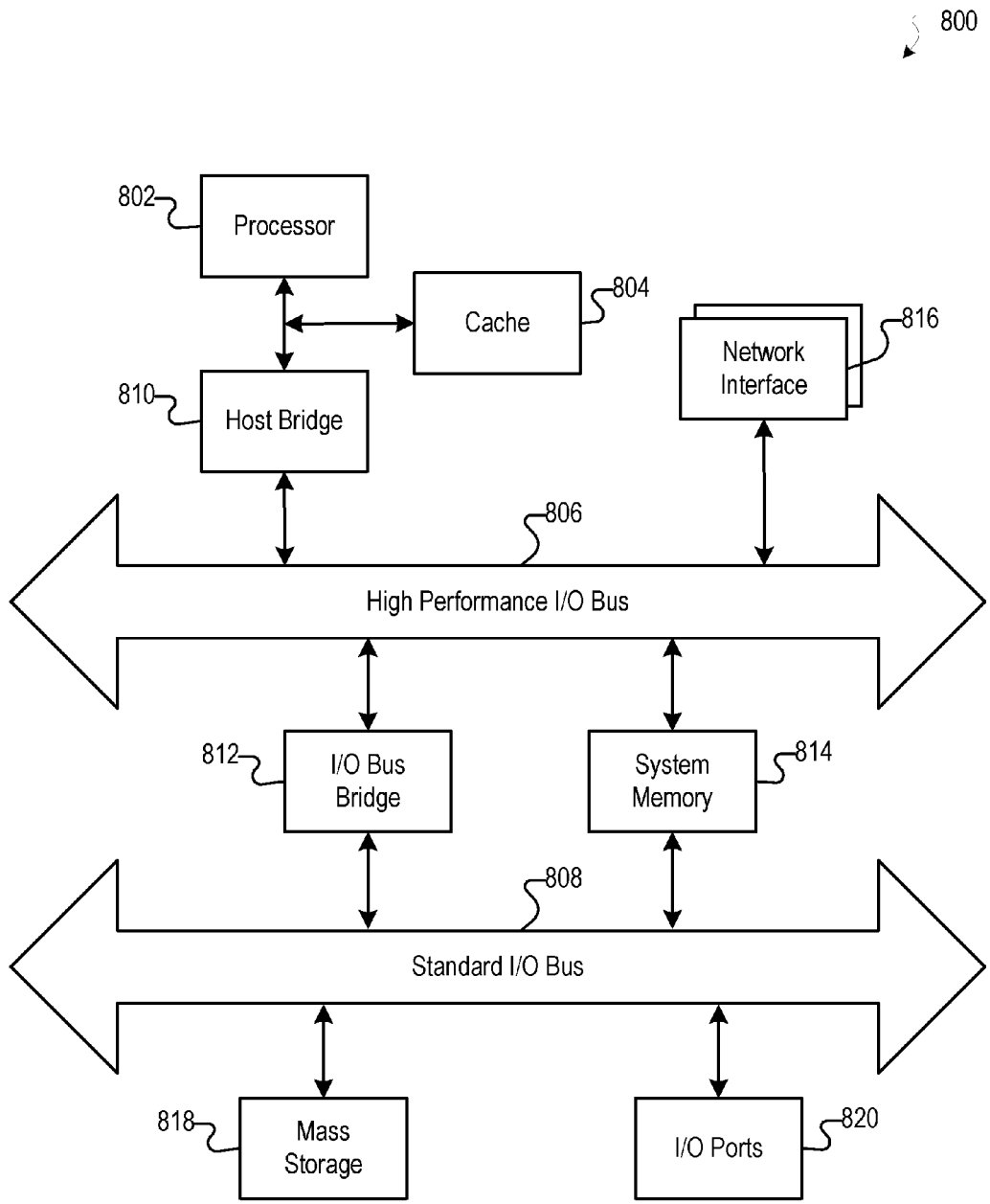
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, a first distance between a first value and a second value, wherein the first value is based on provision of a first image including a first set of poselets associated with a first user into a first instance of a neural network and the second value is based on provision of a second image including a second set of poselets associated with the first user into a second instance of the neural network;
   determining, by the computing system, a second distance between the first value and a third value, wherein the third value is based on provision of a third image including a third set of poselets associated with a second user into a third instance of the neural network; and
   training, by the computing system, the neural network to cause the first distance to be less than the second distance.

2. The computer-implemented method of claim 1, wherein at least one of the first value, the second value, and the third value is a multi-dimensional vector.

3. The computer-implemented method of claim 1, wherein the first image corresponds to a query image, wherein the second image corresponds to a positive image, wherein the third image corresponds to a negative image, wherein the first image, the second image, and the third image are included in a set of training images.

4. The computer-implemented method of claim 1, wherein the training of the neural network includes modifying one or more weights associated with the neural network via one or more neural network back-propagation processes.

5. The computer-implemented method of claim 1, wherein the training of the neural network to cause the first distance to be lesser than the second distance is based on minimizing a loss metric, and wherein the loss metric is determined by calculating a maximum value between zero and (1−the second distance+the first distance).

6. The computer-implemented method of claim 5, wherein the first distance corresponds to a first Euclidean distance between the first value and the second value, and wherein the second distance corresponds to a second Euclidean distance between the first value and the third value.

7. The computer-implemented method of claim 1, further comprising:
   determining that the first distance is less than a specified distance threshold.

8. The computer-implemented method of claim 1, wherein the first set of poselets and the second set of poselets are included within a set of defined poselets.

9. The computer-implemented method of claim 8, wherein the set of defined poselets is associated with at least one of a body portion, a combination of multiple body portions, a front facial portion, a side facial portion, a head portion, a hair portion, a wearable article portion, a perspective, or a pose.

10. The computer-implemented method of claim 1, wherein each of the first value and the second value is associated with 256 dimensions.

11. A system comprising:
    at least one processor; and
    a memory storing instructions that, when executed by the at least one processor, cause the system to perform:
       determining a first distance between a first value and a secondvalue, wherein the first value is based on provision of a first image including a first set of poselets associated with a first user into a first instance of a neural network and the second value is based on provision of a second image including a second set of poselets associated with the first user into a second instance of the neural network;
       determining a second distance between the first value and a third value, wherein the third value is based on provision of a third image including a third set of poselets associated with a second user into a third instance of the neural network; and
       training the neural network to cause the first distance to be less than the second distance.

12. The computer-implemented method of claim 11, wherein at least one of the first value, the second value, and the third value is a multi-dimensional vector.

13. The system of claim 11, wherein the training of the neural network to cause the first distance to be lesser than the second distance is based on minimizing a loss metric, and wherein the loss metric is determined by calculating a maximum value between zero and (1−the second distance+the first distance).

14. The system of claim 13, wherein the first distance corresponds to a first Euclidean distance between the first value and the second value, and wherein the second distance corresponds to a second Euclidean distance between the first value and the third value.

15. The system of claim 11, wherein the instructions cause the system to further perform:
    determining that the first distance is less than a specified distance threshold.

16. A non-transitory computer-readable storage medium including instructions that, when executed by at least one processor of a computing system, cause the computing system to perform a method comprising:
    determining a first distance between a first value and a second value, wherein the first value is based on provision of a first image including a first set of poselets associated with a first user into a first instance of a neural network and the second value is based on provision of a second image including a second set of poselets associated with the first user into a second instance of the neural network;

determining a second distance between the first value and a third value, wherein the third value is based on provision of a third image including a third set of poselets associated with a second user into a third instance of the neural network; and training the neural network to cause the first distance to be less than the second distance.

17. The computer-implemented method of claim 16, wherein at least one of the first value, the second value, and the third value is a multi-dimensional vector.

18. The non-transitory computer-readable storage medium of claim 16, wherein the training of the neural network to cause the first distance to be lesser than the second distance is based on minimizing a loss metric, and wherein the loss metric is determined by calculating a maximum value between zero and (1−the second distance+ the first distance).

19. The non-transitory computer-readable storage medium of claim 18, wherein the first distance corresponds to a first Euclidean distance between the first value and the second value, and wherein the second distance corresponds to a second Euclidean distance between the first value and the third value.

20. The non-transitory computer-readable storage medium of claim 16, wherein the instructions cause the system to further perform:

determining that the first distance is less than a specified distance threshold.

* * * * *